United States Patent
Mc Clure et al.

(10) Patent No.: US 7,028,671 B2
(45) Date of Patent: Apr. 18, 2006

(54) FUEL RETURN SYSTEMS

(75) Inventors: Daniel H. Mc Clure, Rochester Hills, MI (US); Jon E. Johnson, Fenton, MI (US); Todd M. Niedecken, Burt, MI (US)

(73) Assignee: General Motors Corporations, Detroit, MI (US)

( * ) Notice: Subject to any disclaimer, the term of this patent is extended or adjusted under 35 U.S.C. 154(b) by 39 days.

(21) Appl. No.: 10/923,422

(22) Filed: Aug. 20, 2004

(65) Prior Publication Data
US 2006/0037587 A1   Feb. 23, 2006

(51) Int. Cl.
*F02M 37/04*   (2006.01)

(52) U.S. Cl. .................. 123/514; 137/255

(58) Field of Classification Search .......... 123/514, 123/509, 510; 137/255, 391, 571, 416, 38, 137/42, 118.06

See application file for complete search history.

(56) References Cited

U.S. PATENT DOCUMENTS

| | | | |
|---|---|---|---|
| 3,981,321 A * | 9/1976 | Risse et al. ............... | 137/255 |
| 5,168,891 A * | 12/1992 | Green et al. ............... | 137/114 |
| 5,287,841 A * | 2/1994 | Forsythe et al. ........... | 123/510 |
| 6,450,151 B1 * | 9/2002 | Frank et al. ............... | 123/514 |
| 6,729,310 B1 * | 5/2004 | Ekstam ...................... | 123/516 |
| 6,845,782 B1 * | 1/2005 | Osterkil et al. ............. | 137/1 |
| 6,860,285 B1 * | 3/2005 | Ehrman et al. ............. | 137/38 |

* cited by examiner

*Primary Examiner*—Mahmoud Gimie
(74) *Attorney, Agent, or Firm*—Laura C. Hargitt

(57) ABSTRACT

A fuel return system for returning fuel from a fuel pump to first and second fuel tanks in an automotive vehicle includes an open T fitting having branches connected through couplings to the first and second fuel tanks. The couplings each have a low return, fuel flow orifice which is continually open and a high return, fuel flow orifice which is normally closed by a valve. The low pass through orifices prevent one tank from receiving extra fuel during idle and allow the first and second fuel tanks to siphon to the same fuel level when the vehicle is parked. The high flow through orifices open to prevent return fuel back pressure to the engine and have a cracking pressure responsive to the engine running at a level higher than idle.

17 Claims, 5 Drawing Sheets

FUEL RETURN SYSTEMS

FIELD OF THE INVENTION

The present invention relates to fuel return systems for returning unused fuel from a vehicle engine to at least a pair of fuel tanks. More particularly, the present invention is directed to a fuel return system which over time maintains an even distribution of fuel in a pair of fuel tanks.

BACKGROUND OF THE INVENTION

Currently, vehicles such as diesel trucks use a passive fuel system to draw fuel from two fuel tanks via a T fitting in the fuel lines. Unused fuel is returned to both tanks through a similar T fitting. It is desirable to maintain the level of fuel in the two tanks substantially even, however when diesel engines are tuned to a high level of efficiency, the flow return rate of fuel to the tanks is low during idling. A low fuel return rate can result in fuel taking a path of least resistance and trickling into only one of the tanks. Overtime, fuel being returned in the system could fill one tank while leaving the other empty. If one tank is empty, air can be drawn into the fuel lines from the empty tank causing the fuel supply system to loose prime. In view of this concern there is a need for a fuel return system that maintains substantially even levels of fuel in both tanks.

SUMMARY OF THE INVENTION

A fuel return system for returning fuel to at least first and second fuel tanks comprises a fuel return line connected to the fuel pump and to an open split connection with return line branches connected to the fuel tanks. Each branch has an upstream side fluidically connected to the open split connection and a downstream side fluidically connected to one of the tanks. High return fuel flow and low return fuel flow orifices fluidly connect the upstream ends of each branch to the downstream ends of each branch. A pressure responsive valve normally closes the high return fuel flow orifices while the low return fuel flow orifices are open.

In another aspect of the return fuel system a barrier is disposed between upstream and downstream ends of the branches with the return fuel orifices passing through the barrier.

In another aspect of the fuel return system the low return fuel orifices are continuously open.

In another aspect of the fuel return system the high return fuel orifices and the low return orifices pass through separate portions of the barriers.

In a further aspect of the fuel return system each barrier has more than one high return orifice therethrough and the pressure responsive valve is an umbrella valve that simultaneously closes each of the high fuel return orifices.

In another aspect of the fuel return system the branches include quick connect fittings for connecting the upstream ends of the branches to the respective fuel tanks.

In another aspect of the invention the low and high fuel return orifices are disposed in couplings having the quick connect fittings thereon.

DETAILED DESCRIPTION

Figure 1:
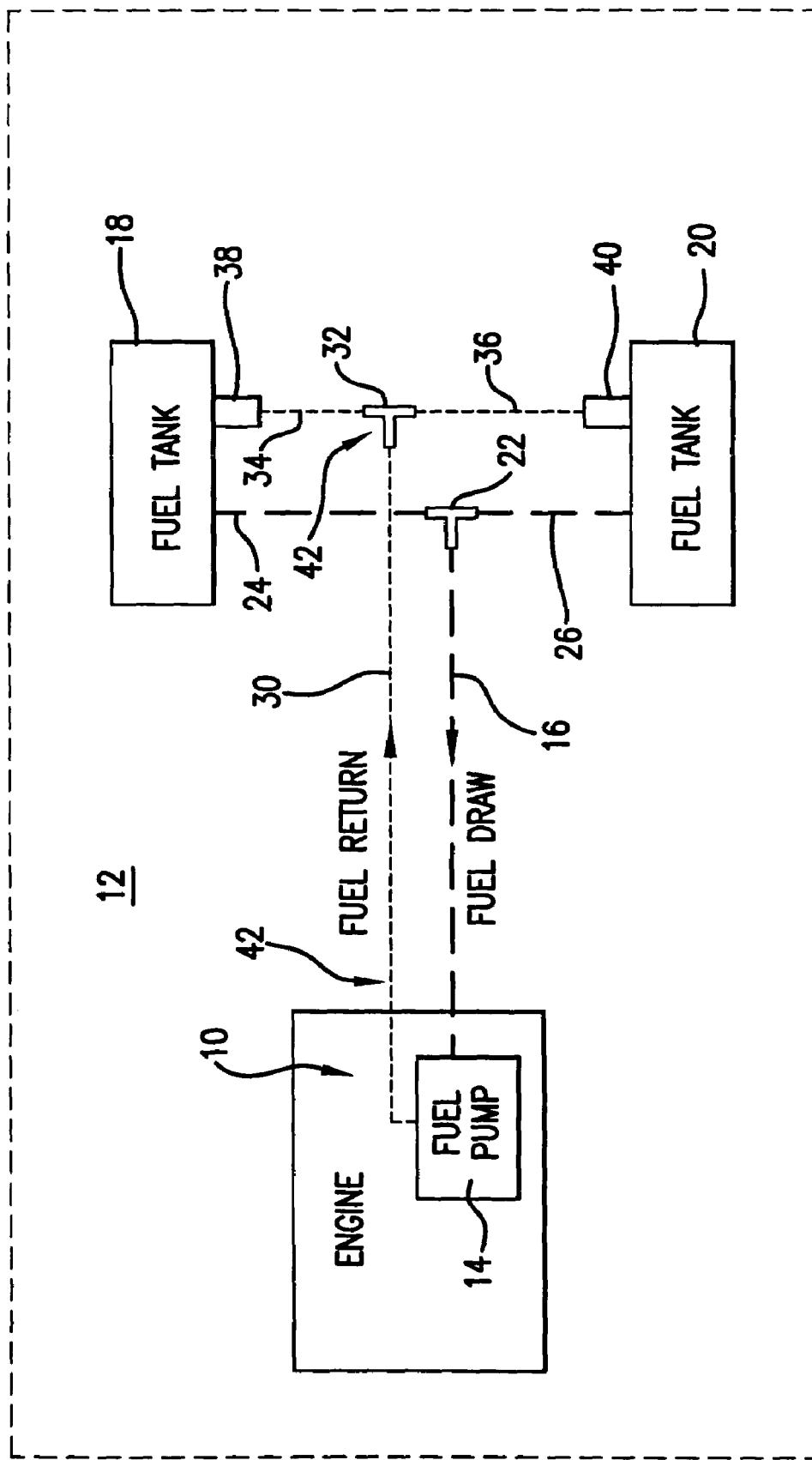
FIG. 1 is a schematic view of a fuel supply system including a fuel return system having branches connected to fuel tanks.

Referring now to FIG. 1, an engine 10 of an automotive vehicle 12 has a fuel pump 14 that draws fuel through a fuel line 16 from first and second tanks 18 and 20 in the automotive vehicle. Fuel line 16 is connected to the first and second tanks by a first T fitting 22 connected by a first fuel draw branch 24 to the first fuel tank 18 and by a second fuel draw branch 26 to the second fuel tank 20.

Connected to the fuel pump 14 is a fuel return line 30 that returns unused fuel from the engine 10 to the first and second fuel tanks 18 and 20. The fuel return line 30 is connected by an open split connection in the form of a T fitting 32 to first and second branches 34 and 36. In a preferred embodiment, couplings 38 and 40 connect the first and second branches to the first and second fuel tanks 18 and 20, respectively. The fuel return line 30 and the first and second branches 34 and 36, with respective couplings 38 and 40, provide a fuel return system 42 that is readily connectable by the couplings to the first and second fuel tanks 18 and 20. The second T fitting 32 is continuously open so that fuel in the fuel return line 30 flows freely through the second T fitting to the couplings 38 and 40 and into the tanks 18 and 20.

Figure 2:
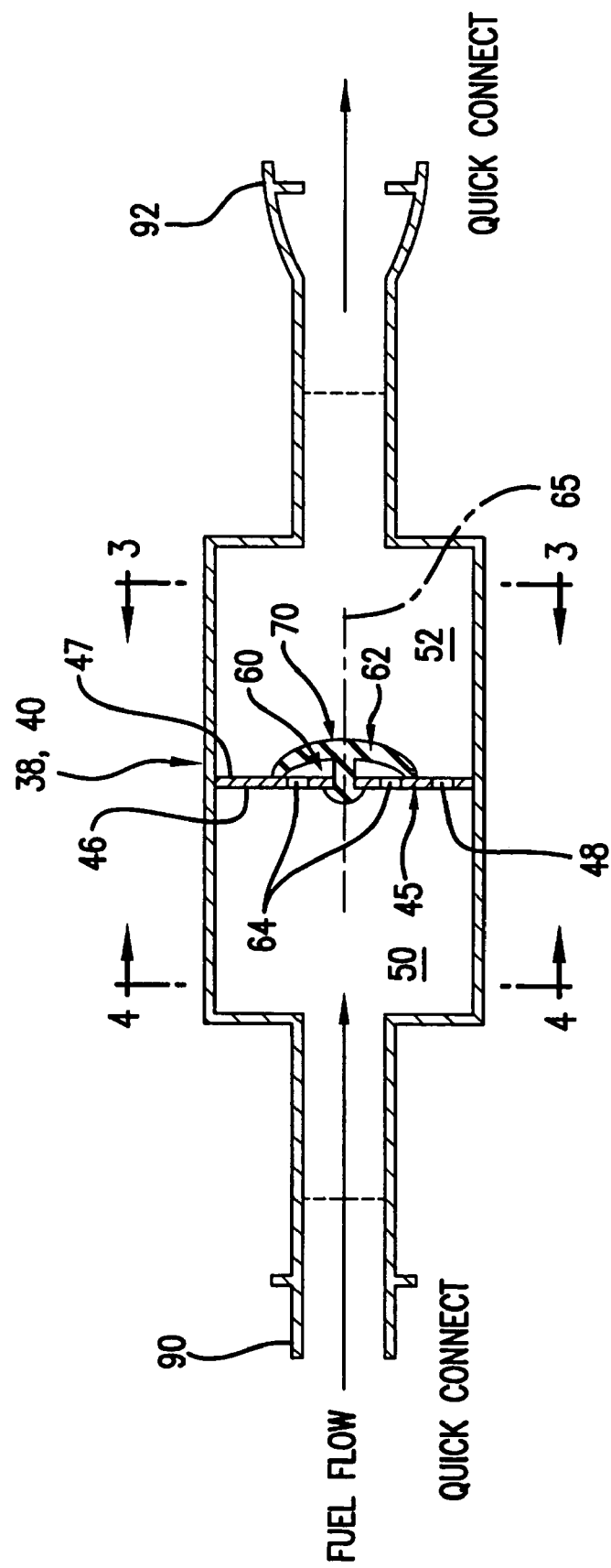
FIG. 2 is a side elevation of one of two couplings used to connect each branch of the fuel return system of FIG. 1 to a fuel tank.

Referring now to FIG. 2 where one of the couplings 38 and 40 is shown, the other coupling being substantially identical, it is seen that the couplings each have a barrier wall 45 with an upstream surface 46 and a downstream surface 47. The barrier walls 45 each have a low flow, pass through orifice 48 that is always open for connecting upstream sides 50 of the couplings 38 and 40 to downstream sides 52 of the couplings so that low pressure fuel in the fuel return line 30 receiving return fuel from the fuel pump 14 flows continuously to the tanks. Consequently, when the engine 10 is idling and fuel pressure in the fuel return line 30 is low, fuel in the fuel return line is still returned to the tanks 18 and 20 after being divided by the T fitting 32. By having an orifice 48 in each of the couplings 38 and 40 that is always open, the branches 34 and 36 do not present different resistances to the flow of return fuel therethrough. Accordingly, instead of trickling to just one of the tanks 18 or 20, the fuel always trickles to both tanks. Consequently, a situation in which there is an empty fuel tank 18 or 20 and a partially full tank is avoided. An empty fuel tank can result in the possibility of air being drawn into the fuel supply line 16 compromising the prime of the fuel pump 14. Moreover, the low fuel flow orifices 48 in the couplings 38 and 40 allow fuel to passively siphon between the tanks 18 and 20, which allows the tanks to reach the same fuel level when the vehicle is parked. The fuel return system 42 is of particular interest with respect to trucks powered by diesel engines 10 having highly tuned fuel systems, however the fuel return system is useful in gasoline engines as well, or any other engines that utilize liquid fuel from a plurality of tanks.

High flow orifice arrangements 60, normally closed by valves 62 are also disposed in the barriers 45. In the illustrated embodiment, the high flow orifice arrangements 60 have a plurality of individual orifices 64 therethrough that are distributed around an axis 65 of each of the couplings 38 and 40. The fuel flow orifices 64 are simultaneously closed and opened by the valves 62 which overlie all of the fuel flow orifices.

Figure 3:
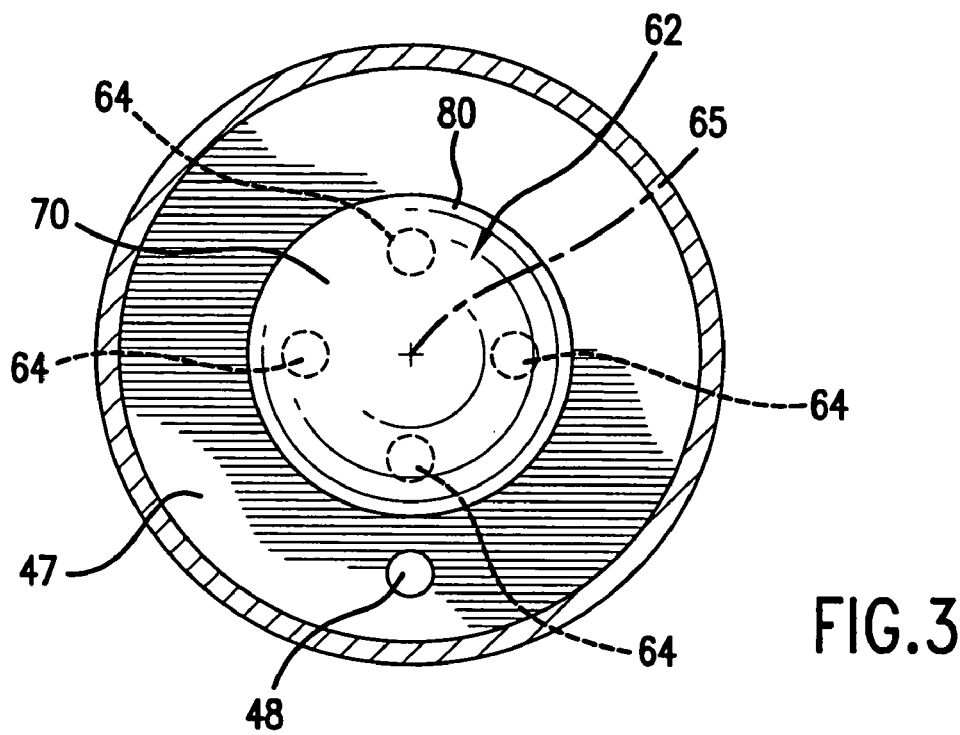
FIG. 3 is an elevational view taken along lines 3—3 of FIG. 2.
Figure 4:
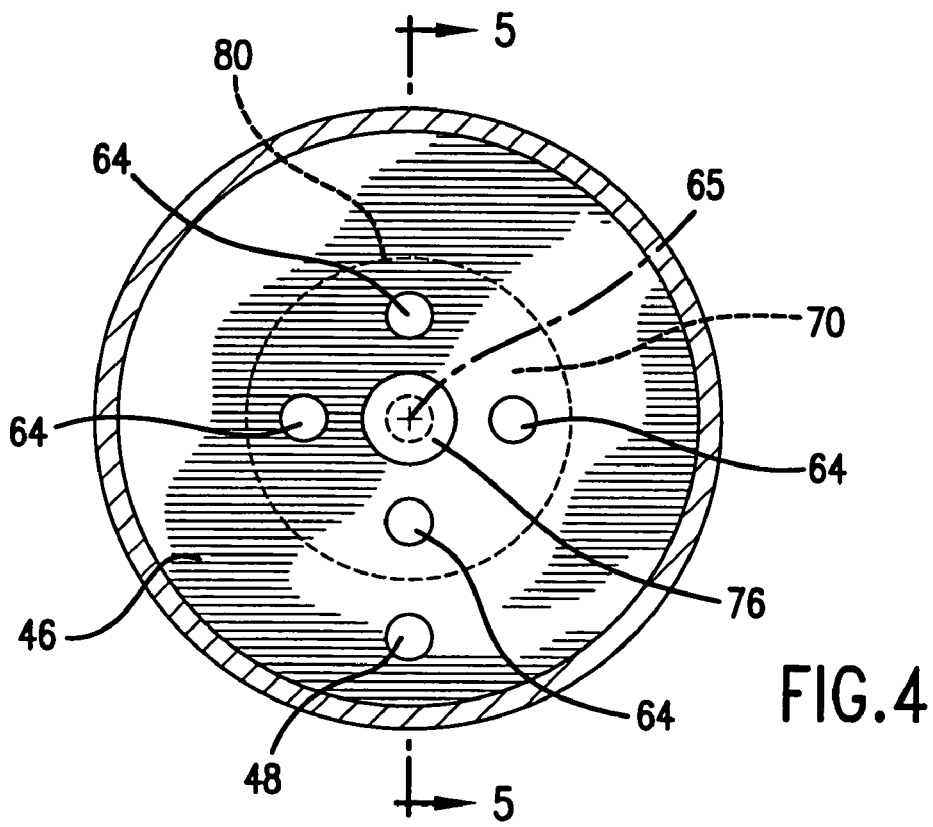
FIG. 4 is an elevational view taken along lines 4—4 of FIG. 2.
Figure 5:
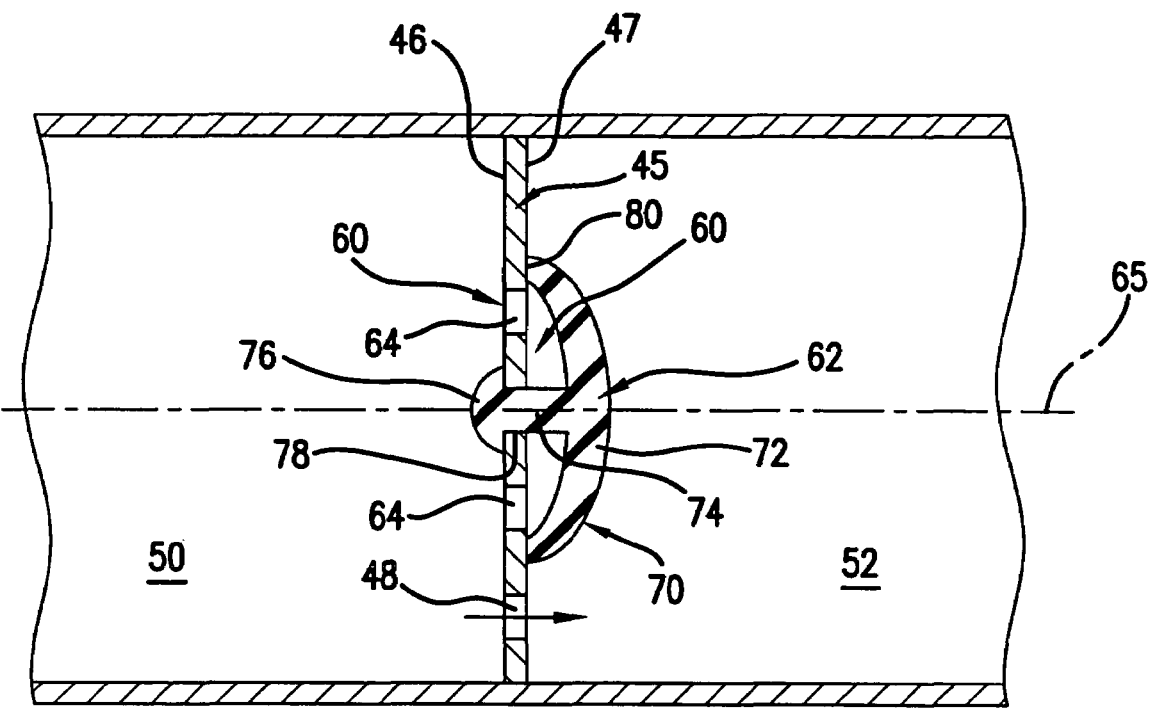
FIG. 5 is a side elevation taken along lines 5—5 of FIG. 4 showing a valve in the coupling closed.
Figure 6:
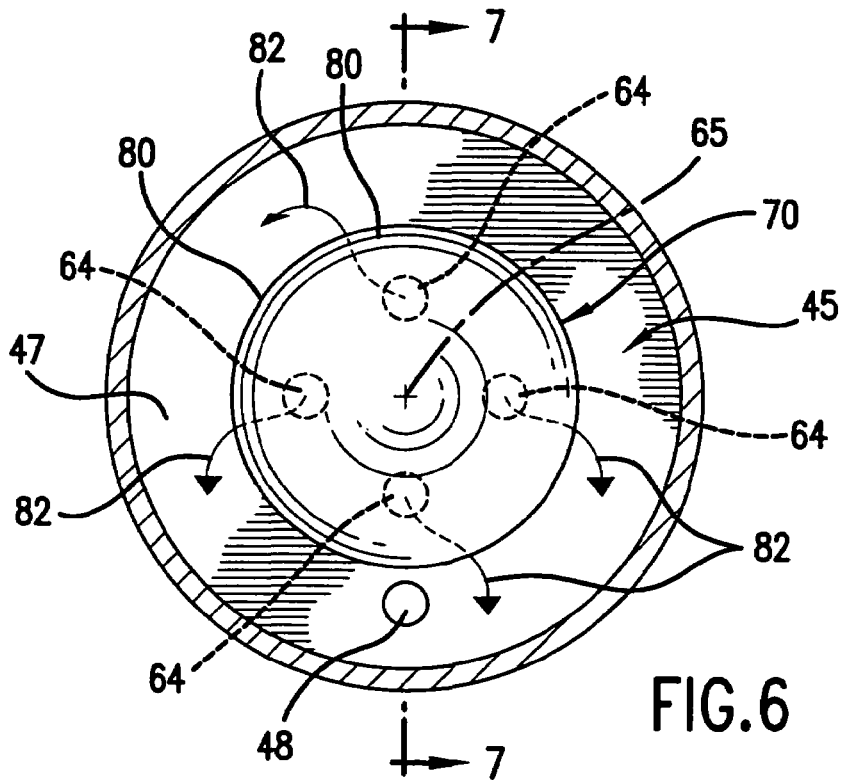
FIG. 6 is an elevation similar to FIG. 3 showing the valve open.
Figure 7:
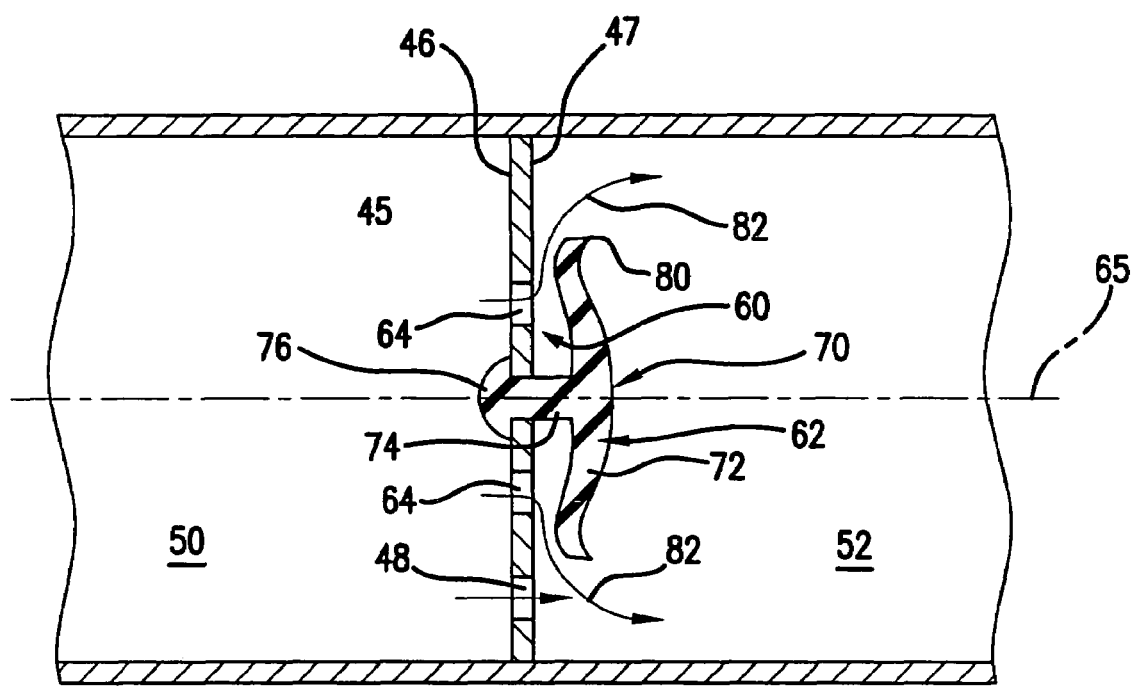
FIG. 7 is the side elevation similar to FIG. 4 showing the valve open.

In the illustrated embodiment, each valve 62 is configured as an elastic umbrella valve 70 which is normally biased to the closed position of FIGS. 3 and 5, but which responds to increased fuel flow pressure and opens as shown in FIGS. 6 and 7. Each of the valves 62 opens when the engine 10 is running higher than idle, during which time the fuel pump 14 draws fuel at a higher rate. When the fuel pump 14 is drawing fuel at a higher rate, the fuel return rate is also higher. The continuously open low fuel flow orifices 48 do not accommodate high fuel return rates. Consequently, relying only on the low fuel flow orifices would cause high back pressure interfering with operation of the engine 10. Accordingly, the valves 62 open the orifices 64 at a preselected cracking pressure of about 1 to about 5 psi occurring at the upstream side 50 of the couplings 38 and 40. In one example, the cracking pressure is about 2.5 psi.

As is seen in FIGS. 2, 5 and 7, the umbrella valves 70 in the couplings 38 and 40 are each configured as a unitary element comprising a domed hood portion 72 with a stem 74 and a barb 76 extending from one end thereof. The barbs 76 of the umbrella valves 70 pass through holes 78 in the barriers 45 that are aligned with the axes 65 of the couplings 38 and 40. The barbs 76 expand in the upstream sides 50 of the couplings, against the upstream surfaces 47 of the barriers, to retain the umbrella valves 70 in place on the barriers. The domed hoods 72 of the umbrella valves 70 have peripheral portions 80 that normally bear against the downstream surfaces 47 of the barriers 45. As is seen in FIGS. 5 and 7, the peripheral portions 80 of the umbrella valves 70 deflect from the FIG. 5 position, where the orifices 64 are sealed off, to the position of FIG. 7 where the orifices 64 are open. This deflection provides gaps 82 that occur between the peripheral portions 80 of the hoods 72 and the downstream surfaces 47 of the barrier walls 45. Fuel is thus allowed to pass through the high flow orifices 64 from the upstream sides 50 to the downstream sides 52 of the couplings 38 and 40. In order to facilitate deflection of the hood portions 72, the thicknesses of the hood portions taper from the stems 74 to the sealing peripheries 80.

While umbrella valves 70 molded of rubber are a preferred embodiments for the valves 62, other valve configurations can be employed as long as the selected configurations normally close the high flow orifice configurations 60. The valves 62 may allow for abrupt or for gradual opening of the orifice configuration 60. Moreover, the low flow orifices 48 in other embodiments may occur through the valves 62 themselves, rather than being radially or laterally displaced with respect to the valves 62.

In accordance with a preferred embodiment of the invention, the couplings 38 and 40 are retrofitable to existing vehicles. Preferably the couplings 38 and 40 each have quick connect end fittings 90 and 92 which cooperate with mating fittings on the first and second fuel tanks 18 and 20 and with mating end fittings on the branches 34 and 36 of the fuel return system 42. In this way, the couplings 38 and 40 are readily insertable in existing fuel return systems. The quick connect fittings 90 and 92 do not require rotation of couplings 38 and 40, but are secured by axial shifting of fitting sleeves in accordance with well known practices.

While utilizing couplings 38 and 40 at downstream ends of the branches 34 and 36 is preferred and facilitates retrofitting, in one embodiment of the low fuel flow and high fuel flow orifices 48 and 64 are components directly incorporated in the branches 34 and 36. In other embodiments of the invention, the couplings 38 and 40 are installed at the upstream ends of the branches 34 and 36 or are positioned intermediate the ends of the branches.

From the foregoing description, one skilled in the art can easily ascertain the essential characteristics of this invention, and without departing form the spirit and scope thereof, can make various changes and modifications of the invention to adapt it to various usages and conditions.

We claim:

1. A fuel return system for returning fuel to at least first and second fuel tanks connected by a fuel draw line to a fuel pump, the return fuel system comprising;
   a fuel return line having an inlet end connected to the fuel pump and an outlet end;
   an open split connection connected to the outlet end of the fuel return line;
   first and second return line branches connected at upstream ends thereof to the open split connection and at downstream ends thereof to the first and second fuel tanks, respectively;
   high return fuel flow and low return fuel flow orifices disposed upstream of the downstream end of each return line branch, and
   a pressure responsive valve normally closing the high return fuel flow orifices while the low return fuel flow orifices are open, until return fuel pressure in the fuel return line exceeds a valve cracking pressure level.

2. The fuel return system of claim 1 wherein the low return fuel orifices are continuously open.

3. The fuel return system of claim 2 wherein a barrier is disposed between the upstream and downstream ends of each of the return line branches, the return fuel orifices extending through the barriers.

4. The fuel return system of claim 3 wherein the high return fuel orifices and low return fuel orifices extend through separate portions of the barriers.

5. The fuel return system of claim 3 wherein the low return fuel flow orifices pass through the pressure responsive valves.

6. The fuel return system of claim 4 wherein each barrier has more than one high fuel return orifice therethrough and wherein the pressure responsive valve is an umbrella valve which simultaneously closes all of the high fuel return orifices.

7. The fuel return system of claim 6 wherein the downstream end of each return line branch has a quick connect fitting for connecting the first and second branches to the first and second fuel tanks, respectively.

8. The fuel return system of claim 1 wherein first and second couplings connect the downstream ends of the first and second branches to the first and second fuel tanks, the first and second couplings having the low fuel flow and high fuel flow orifices disposed therein.

9. The fuel return system of claim 8 wherein the first and second couplings have quick connect fittings for connecting upstream sides thereof to respective first and second return line branches and downstream sides thereof to respective first and second fuel tanks.

10. A fuel return system for returning fuel to at least first and second fuel tanks connected by a fuel draw line to a fuel pump, the return fuel system comprising:

a fuel return line having an inlet connected to the fuel pump and an outlet connected to a T fitting, the T fitting having first and second return line branches connected thereto at upstream ends thereof and connected at downstream ends thereof to the first and second fuel tanks by first and second couplings, respectively;

high return fuel flow and low return fuel flow orifices in each coupling for connecting upstream sides of each coupling to downstream sides of each coupling, and pressure responsive valves normally closing the high return fuel flow orifices in the couplings until return fuel pressure in the fuel return line exceeds a valve cracking pressure level while the low return fuel flow orifices in the couplings remain open at pressure levels less than the valve cracking pressure level.

11. The fuel return system of claim 10 wherein the first and second couplings each have quick connect fittings at the upstream and downstream sides thereof which connect with mating quick connect fittings on the first and second branches, respectively, and on the first and second fuel tanks respectively.

12. The fuel return system of claim 10 wherein the first and second couplings each have barriers therein and wherein the high return fuel flow and low return fuel flow orifices extend through the barriers.

13. The fuel return system of claim 12 wherein the high return orifices comprise a plurality of orifices through each barrier and wherein the valves close the orifices at return fuel line pressures below the valve cracking pressure level.

14. The fuel return system of claim 13 wherein the valves closing the orifices are umbrella valves, each having an extent sufficient to close simultaneously all of the return fuel flow orifices associated therewith.

15. The fuel return system of claim 14 wherein the valve has a cracking pressure in the range of 1 psi to 5 psi.

16. The fuel return system of claim 15 wherein the valve has a cracking pressure of about 2.5 psi.

17. The fuel return system of claim 15 wherein the valve is made of fuel resistant rubber.

* * * * *